US012731078B2

(12) United States Patent
Troyer et al.

(10) Patent No.: US 12,731,078 B2
(45) Date of Patent: Sep. 8, 2026

(54) PROBABILISTIC EVALUATION OF FASTENER DEGRADATION IN NUCLEAR POWER PLANTS

(71) Applicant: FRAMATOME Inc., Lynchburg, VA (US)

(72) Inventors: Greg Troyer, Lynchburg, VA (US); Todd Matthews, Lynchburg, VA (US); Pavan Thallapragada, Lynchburg, VA (US)

(73) Assignee: FRAMATOME Inc.

( * ) Notice: Subject to any disclaimer, the term of this patent is extended or adjusted under 35 U.S.C. 154(b) by 399 days.

(21) Appl. No.: 18/275,609

(22) PCT Filed: Feb. 3, 2022

(86) PCT No.: PCT/US2022/015030
§ 371 (c)(1),
(2) Date: Aug. 2, 2023

(87) PCT Pub. No.: WO2022/169928
PCT Pub. Date: Aug. 11, 2022

(65) Prior Publication Data

US 2024/0119356 A1 Apr. 11, 2024

Related U.S. Application Data

(60) Provisional application No. 63/145,074, filed on Feb. 3, 2021.

(51) Int. Cl.
*G06N 20/00* (2019.01)
*G21C 17/00* (2006.01)

(52) U.S. Cl.
CPC ............ *G06N 20/00* (2019.01); *G21C 17/00* (2013.01)

(58) Field of Classification Search
CPC ................................ G01N 20/00; G21C 17/00
See application file for complete search history.

(56) References Cited

U.S. PATENT DOCUMENTS 10,437,939 B2 * 10/2019 Troyer .................. G21D 3/001
2017/0337298 A1 11/2017 Troyer et al.

OTHER PUBLICATIONS

International Search Report for PCT/US2022/015030.
(Continued)

*Primary Examiner* — Sujoy K Kundu
(74) *Attorney, Agent, or Firm* — Davidson Kappel LLC

(57) ABSTRACT

A probabilistic method for determining an operability interval for fasteners in a nuclear power plant assembly includes providing a geometric distribution of a given initial condition of fasteners in the nuclear power plant assembly at an initial time T0; generating a plurality of random future fastener failure patterns by applying a fastener failure probability model to the geometric distribution at a given time T1>T0; inputting the plurality of random future fastener failure patterns at time T1 into a machine learning model and outputting stresses of the fasteners and displacements of the components; iterating, by a processor of a computer, the applying and inputting steps for a given range of time values T2, T3, . . . , Tx>T0 and determining a maximum future time Tmax at which a predetermined acceptable probability of the fastener failure patterns having acceptable values of the stresses of the fasteners and displacements of the components, thereby justifying the acceptability of the fasteners for continued operation of the nuclear power plant assembly; and determining the operability interval as being the maximum future time Tmax minus the initial time T0.

10 Claims, 8 Drawing Sheets

(56) References Cited

OTHER PUBLICATIONS

Uhrig R E: "Use of Neural Networks In Nuclear Power Plants", Technical Paper of ISA, Instrument Society of America, vol. 47, No. Part 01, Jan. 1, 1992, p. 327-334.

* cited by examiner

β = 1, θ = 20
β = 1, θ = 50
β = 1, θ = 100
β = 2, θ = 50
β = 4, θ = 50
β = 8, θ = 50

F(t) (cumulative probability)
100%
80%
60%
40%
20%
0%
F(t = θ) = 0.632
0
20
40
60
80
100
Dependent Parameter (EFPY)

PROBABILISTIC EVALUATION OF FASTENER DEGRADATION IN NUCLEAR POWER PLANTS

CROSS REFERENCES

This application claims the benefit of U.S. Provisional Patent Application No. 63/145,074, filed Feb. 3, 2021, which is incorporated by reference herein in its entirety.

TECHNICAL FIELD

The present disclosure relates generally to nuclear power plants and more specifically to a method of assessing the degradation of fasteners.

BACKGROUND

Fasteners, such as bolts, rivets, split pins and welds, are used in various components in a nuclear power plant. In particular, core barrel bolts are used to fix baffles in place in nuclear reactor pressure vessels. FIG. 1*a* shows a perspective cross-sectional view of components of an exemplary pressurized water reactor (PWR) 10 that are fixed together by bolts. PWR 10 includes reactor vessel (RV) internals including a core barrel assembly 11. Core barrel assembly 11 includes a cylindrical core barrel 12 and a plurality of baffle plates 14 fixed to an inner circumferential surface 12*a* of core barrel 12 by a plurality of former plates 16. Baffle plates 14 are situated on top of a lower core plate 18, which is positioned above a lower support plate 20.

FIG. 1*b* shows an enlarged cross-sectional view of a portion of core barrel assembly 11 in which core barrel 12, baffle plates 14 and former plates 16 are connected together by a plurality of fastened connections using bolts 22, 24, 26. On a left half of FIG. 1*b*, baffles plates 14 are omitted to more clearly show former plates 16. Baffle plates 14 extend vertically, parallel to a center axis of core barrel 12, while former plates 16 extend horizontally, perpendicular to the center axis of core barrel 12. Baffle plates 14 are fixed together to define a plurality of right angles such that core facing vertically extending surfaces 15*a* of baffle plates 14 define a fluid flow path in the reactor core, with each baffle plate 14 being arranged perpendicularly to the two adjacent baffle plates 14. Baffle plates 14 may be fixed together by baffle-to-baffle (B-B) bolts 22.

Former plates 16 each include at least two inner edges 17*a* each for contacting a barrel facing vertically extending surface 15*b* of one of baffle plates 14. Inner edges 17*a* are each arranged perpendicular to the two adjacent inner edges 17*a*. Former plates 16 also each include a rounded outer edge 17*b* that is shaped to rest flush against inner circumferential surface 12*a* of core barrel 12. Former plates 16, at outer edges 17*b*, are fixed to inner circumferential surface 12*a* of core barrel 12 by core barrel-to-former (CB-F) bolts 24 that pass radially through core barrel 12 and into former plates 16 at outer edges 17*b*. Baffle plates 14, at barrel facing surfaces 15*b*, are fixed to inner edges 17*a* of former plates 16 by baffle-to-former (B-F) bolts 26 that pass radially through vertically extending surfaces 15*a*, 15*b* and into former plates 16 at inner edges 17*a*. These bolted connections are susceptible to degradation mechanisms that result in bolt failure, which is a loss of fastening capacity. Accordingly, the integrity of a structure with these bolted connections needs to be evaluated to account for future bolt failures. A redundant set of fasteners that may need to be assessed for degradation are also used in various other assemblies in nuclear power plants.

The Electric Power Research Institute (EPRI) Materials Reliability Program (MRP) developed inspection and evaluation (I&E) guidelines in MRP-227, Revision 1-A for managing long-term aging of PWR reactor vessel (RV) internal components. The I&E guidelines concentrate on eight aging degradation mechanisms and their aging effects. The I&E guidelines define requirements for inspections that will allow owners of PWRs to demonstrate that the effects of aging degradation are adequately managed for the period of extended operation.

MRP-227, Revision 1-A includes a safety evaluation report (SER) prepared by the U. S. Nuclear Regulatory Commission (NRC). The NRC staff determined whether the guidance contained in the report provided reasonable assurance that the I&E guidelines ensured that the RV internals components will maintain their intended functions during the period of extended operation. From the determination, one plant-specific applicant/licensee action item (A/LAIs) was contained in the SER to alleviate issues and concerns of the NRC staff. The plant-specific A/LAI addresses topics related to the implementation of MRP-227 that could not be effectively addressed on a generic basis in MRP-227.

The sixth A/LAI addresses NRC staff concerns regarding inaccessible components for Babcock & Wilcox (B&W)-designed components. A/LAI 6 lists B&W external baffle-to-baffle bolts, B&W core barrel-to-former bolts, and B&W core barrel assembly internal baffle-to-baffle bolts as inaccessible components that do not need to be inspected under MRP-227 and B&W core barrel assembly internal baffle-to-baffle bolts as accessible components that are non-inspectable using currently available examination techniques. A/LAI then states that, to justify the acceptability of these components for continued operation through the period of extended operation of these components, these components should be evaluated or scheduled for replacement.

One current industry solution involves performing a detailed analysis of the structural integrity with a postulated future bolt failure pattern. If failures are identified by ultrasonic inspection at a given unit, an acceptable operating interval (i.e., re-examination interval) for that unit is defined in WCAP-17096 Rev 2, based on the number of required bolts, which is determined per a detailed analysis, and the number of bolt failures and/or replacements. Such a re-examination interval is based on a deterministic (i.e., a single future failure pattern) evaluation of structural integrity, such as that defined in WCAP-15030-NP-A.

U.S. Publication No.: 2017/0337298 discloses a probabilistic method that provides an assessment of fastener degradation in a nuclear power plant using fastener spacing rules.

SUMMARY OF THE INVENTION

An object of the present invention is to provide a probabilistic method that provides a less conservative assessment of fastener degradation in a nuclear power plant than the one using fastener spacing rules.

A probabilistic method for determining an operability interval for fasteners in a nuclear power plant assembly is provided. The probabilistic method includes providing a geometric distribution of a given initial condition of fasteners in the nuclear power plant assembly at an initial time T0; generating a plurality of random future fastener failure patterns by applying a fastener failure probability model to the geometric distribution at a given time T1>T0; inputting the plurality of random future fastener failure patterns at time T1 into a machine learning model and outputting stresses of the fasteners and displacements of the components; iterating, by a processor of a computer, the applying and inputting steps for a given range of time values T2, T3, . . . , Tx>T0 and determining a maximum future time Tmax at which a predetermined acceptable probability of the fastener failure patterns having acceptable values of the stresses of the fasteners and displacements of the components, thereby justifying the acceptability of the fasteners for continued operation of the nuclear power plant assembly; and determining the operability interval as being the maximum future time Tmax minus the initial time T0.

A probabilistic method for determining an operability interval for fasteners in a nuclear power plant assembly is also provided including (a) providing a geometric distribution of a given initial condition of fasteners in the nuclear power plant assembly at an initial time T0; (b) generating a plurality of random future fastener failure patterns by applying a fastener failure probability model to the geometric distribution at a given time T1>T0; (c) determining stress of the fasteners and displacements of the component for each of the plurality of random future fastener failure patterns at time T1; (d) determining a probability of the plurality of random future fastener failure patterns being acceptable as a population at time T1; (e) applying the fastener failure probability model to the geometric distribution at a given time T2>T1 by taking into consideration the stress of the fasteners and displacements of the component for each of the plurality of random future fastener failure patterns at time T1; (f) determining stress of the fasteners and displacements of the component for each of the plurality of random future fastener failure patterns at time T2; (g) determining a probability of the plurality of random future fastener failure patterns being acceptable as a population at time T2; (h) iterating, by a processor of a computer, steps (d) to (g) for a given range of time values T3, T4, . . . , Tx>T2 and determining a maximum future time Tmax at which a predetermined acceptable probability of the fastener failure patterns having acceptable values of the stresses of the fasteners and displacements of the components, thereby justifying the acceptability of the fasteners for continued operation of the nuclear power plant assembly; and (i) determining the operability interval as being the maximum future time Tmax minus the initial time T0.

A probabilistic method for determining an operability interval for fasteners in a nuclear power plant assembly is also provided including (a) providing a geometric distribution of a given initial condition of fasteners in the nuclear power plant assembly at an initial time T0, the given initial condition including a pattern of replacement fasteners; (b) generating a plurality of random future fastener failure patterns by applying a fastener failure probability model to the geometric distribution at a given time T1>T0; (c) inputting the plurality of random future fastener failure patterns at time T1 into a machine learning model, for example an artificial neural network, and outputting stresses of the fasteners and displacements of the components; (d) iterating, by a processor of a computer, the applying and inputting steps for a given range of time values T2, T3, . . . , Tx>T0 and determining a maximum future time Tmax at which a predetermined acceptable probability of the fastener failure patterns having acceptable values of the stresses of the fasteners and displacements of the components, thereby justifying the acceptability of the fasteners for continued operation of the nuclear power plant assembly; and (e) performing steps (a) to (d) for a plurality of different patterns of replacement fasteners; and selecting the pattern of replacement fasteners having the greatest maximum future time Tmax as fastener replacement strategy.

A computer program product, disposed on a non-transitory computer readable media, for probabilistically determining an operability interval for fasteners in a nuclear power plant assembly is also provided. The computer program product includes for example computer executable process steps operable to control a computer to implement one or more of the probabilistic methods.

A computer configured for probabilistically determining an operability interval for fasteners in a nuclear power plant assembly is also provided. The computer is for example configured for implementing one or more of the probabilistic methods.

BRIEF DESCRIPTION OF THE DRAWINGS

The present invention is shown with respect to the drawings in which.

DETAILED DESCRIPTION

The present disclosure provides probabilistic structural analysis that uses an artificial neural network in place of the fastener spacing rules for a more accurate, yet efficient approach. The increased accuracy allows for less conservative results, leading to a longer operability interval than using fastener spacing rules. As mentioned in "Probabilistic Structural Analysis for Aging Management of Reactor Internals Bolting," Troyer et al., Proceedings of the ASME 2017 Pressure Vessels and Piping Conference, PVP2017, Jul. 16-20, 2017, Waikoloa, Hawaii, U.S., the economic outlook of U.S. nuclear power plants is uncertain and "characterizing and managing enterprise risk associated with aging of nuclear power plant components is critical to survival" and "[a]ging management of the reactor internals is a key technical issue for long-term operation." Accordingly, by determining an operability interval of a nuclear reactor in efficiently and accurately manner, can directly impact the continued operation of nuclear reactors.

Figure 2:
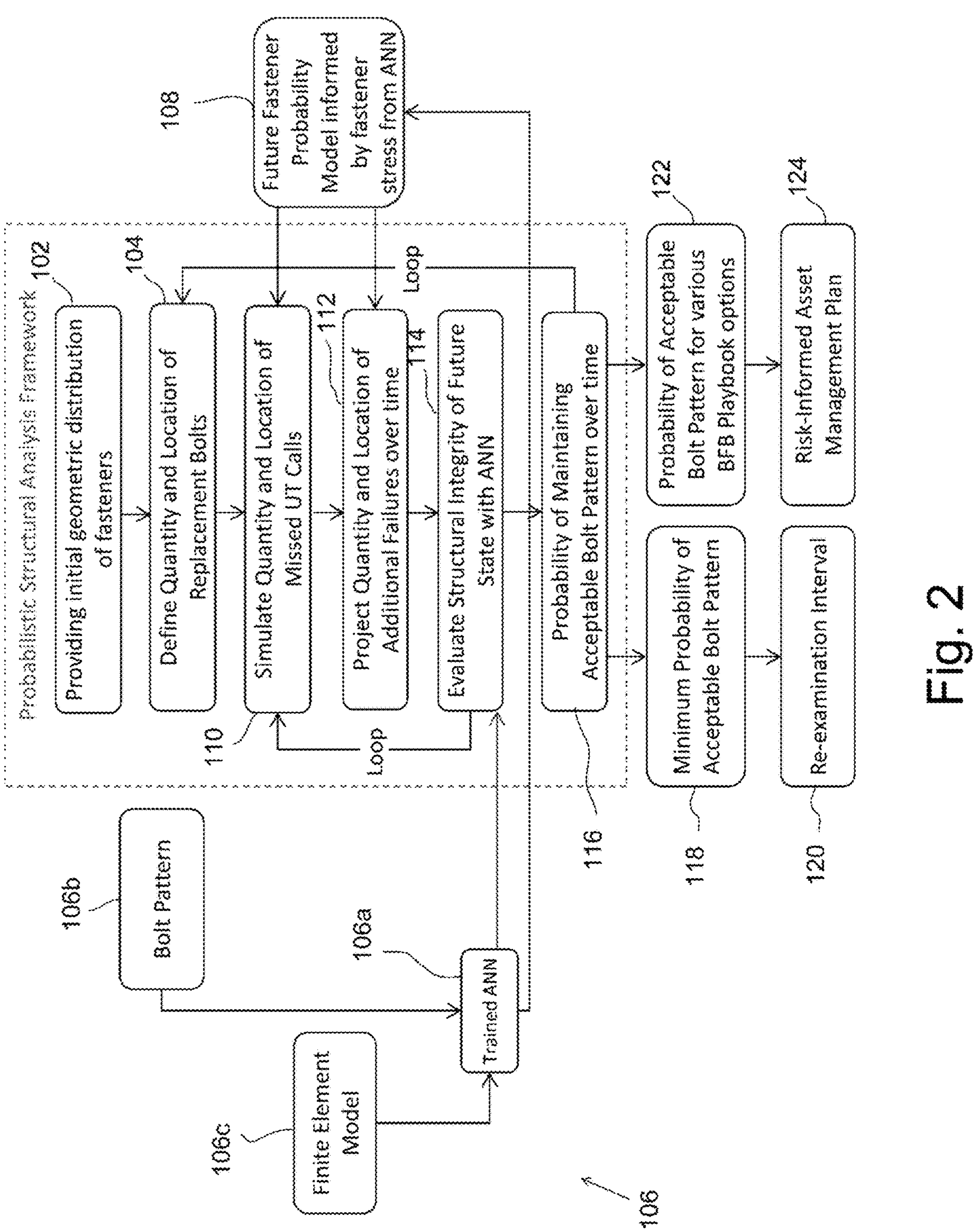
FIG. 2 shows a flow chart illustrating the general steps of a probabilistic method according to an embodiment of the present invention.
Figure 3:
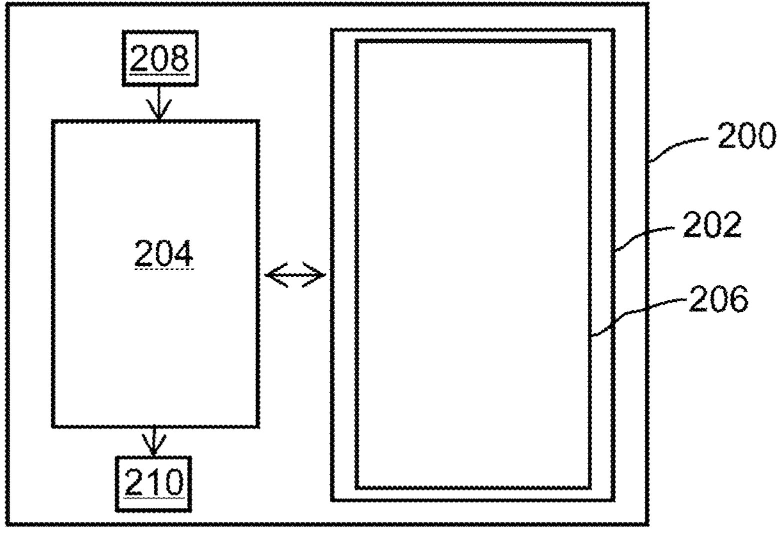
FIG. 3 shows a computer configured for implementing the method of FIG. 2.

FIG. 2 shows a flow chart illustrating the general steps of a probabilistic method 100 for probabilistically determining an operability interval for fasteners in a nuclear power plant assembly according to an embodiment of the present invention. FIG. 3 schematically shows a computer 200 configured for implementing method 100 of FIG. 2. Computer 200 includes a memory 202, which stores a data structure 206 including a plurality of data records.

Computer 200 further includes a processor 204 configured to access the data in data records of data structure 206 and perform the steps of in accordance with the method 100 as described below in response to inputs from a user via an input device 208 of computer 200 to determine the operability interval for the fasteners in the nuclear power plant assembly and display the operability to a user on an output device 210, e.g., a display, of the computer 200. Input devices 208 may each be at least one of a keyboard, a mouse or a touchscreen. In some embodiments of the present invention a computer program product may be provided to memory 202 that includes data structure 206 such that the computer program product can instruct processor 204 to carry out the method 100 described below.

A purpose of method 100 is to evaluate the probability of maintaining an acceptable fastener pattern in the future, based on a known or postulated initial fastener pattern and a future fastener failure probability model. The future fastener failure probability model includes a relative probability of fastener failures in different locations in the analyzed structure, which in this embodiment is the core barrel assembly. The future fastener failure probability model provides a probability distribution of future fastener failures as a function of time for all applicable degradation mechanisms.

In this embodiment, method 100 considers the aging degradation mechanisms applicable to B-F and CB-F fasteners, as reported in MRP-231 Revision 2 and Revision 3, which includes Irradiation-Assisted Stress Corrosion Cracking (IASCC), Irradiation-Enhanced Stress Relaxation/Irradiation Creep (ISR/IC) leading to Wear and Fatigue, and Irradiation Embrittlement (IE).

A first step 102 of method 100 includes providing an initial geometric distribution of a given initial condition of fasteners in the nuclear power plant assembly at an initial time T0. The geometric distribution of the given initial condition of the fasteners may be determined by inspection in the form of ultrasonic testing (UT) the fasteners if the fasteners are inspectable during a shutdown operation, to determine locations in the nuclear power plant assembly where fasteners have failed. If the fasteners are not inspectable, or it is not desirable to inspect the fasteners for example due to time constraints, the geometric distribution of the initial condition of the fasteners may be assumed based on past inspection results at other plants. For example, in this embodiment, certain locations of CB-F bolts and/or B-F bolts may be determined to be failed or functional based on inspection results or may be assumed to be failed or functional based on past inspection results at other plants.

The geometric distribution of the fasteners may include as found conditions of known or assumed functional fasteners or a combination of known or assumed functional fasteners with replacement fasteners to be installed at T0. As used herein, as found refers to condition in which accessible fasteners are examined to be in when the reactor is stopped for an outage and the assumed functional condition where no or limited examination is possible—essentially a photograph of the fastener population as is at the time of stoppage.

Method 100 may also include a step 104 of defining a quantity and location of replacement fasteners in the geometric distribution. In other words, if replacement fasteners are going to be installed at specific locations at T0, these fasteners are assumed to be functional in the geometric distribution of a given initial condition of fasteners.

A step 106 of method 100 includes generating and training an artificial neural network (ANN) 106*a*. In one exemplary embodiment, the ANN is a convolutional neural network (CNN). For example, the ANN may be created and trained using Keras as a front-end API atop TensorFlow with Python. For training the model, in one exemplary embodiment, a plurality fastener patterns 106*b* for the CB-F bolts are used as the input for the ANN, and a horizontal displacement of the baffle plates and stress on the CB-F bolts are used as the output. Training and validation dataset may be generated using finite element method (FEM) software. A FEM simulates real-world conditions by considering the impact of a number of different physics that occur concurrently, such as structural dynamics, heat transfer, fluid flow, nonlinear material behavior and motion. One exemplary FEM is described in R. E. Schwirian et al., "The Baffle-Barrel-Bolting Analysis Program: Evolution and Technical Accomplishments," Proceedings of ICONE 9, 9th International Conference on Nuclear Engineering, Apr. 8-12, 2001, Nice, France. In this embodiment the FEM 106*c* includes thermal hydraulic analyses, structural analyses and reactivity analyses associated with control rod insertability. As the baffle plates deform over time the baffle plates are displaced toward the reactor core, the stresses generated in the CB-F bolts as the CB-F bolts resist the deformation.

A plurality of fasteners patterns with different numbers of failed fasteners and different locations of failed fasteners may be generated to train the ANN. For example, hundreds of different fastener failure patterns may be developed, including different failure percentages. For example, a random number generator could be used to generate a number of patterns where 20% of the fasteners are failed, a number of patterns where 30% of the fasteners are failed and a number of patterns where 50% of the fasteners are failed. For each fastener pattern used in the training set and the validation set, the FEM determines the horizontal displacement of the baffle plates at a plurality of locations and a stress on each of the CB-F bolts. A first subset of the fastener patterns are then used as a training set to train the ANN and a second subset of the known acceptable fastener patterns are used as a validation set to validate the accuracy of the trained ANN.

Figures 5A, 5B, 5C, 5D:
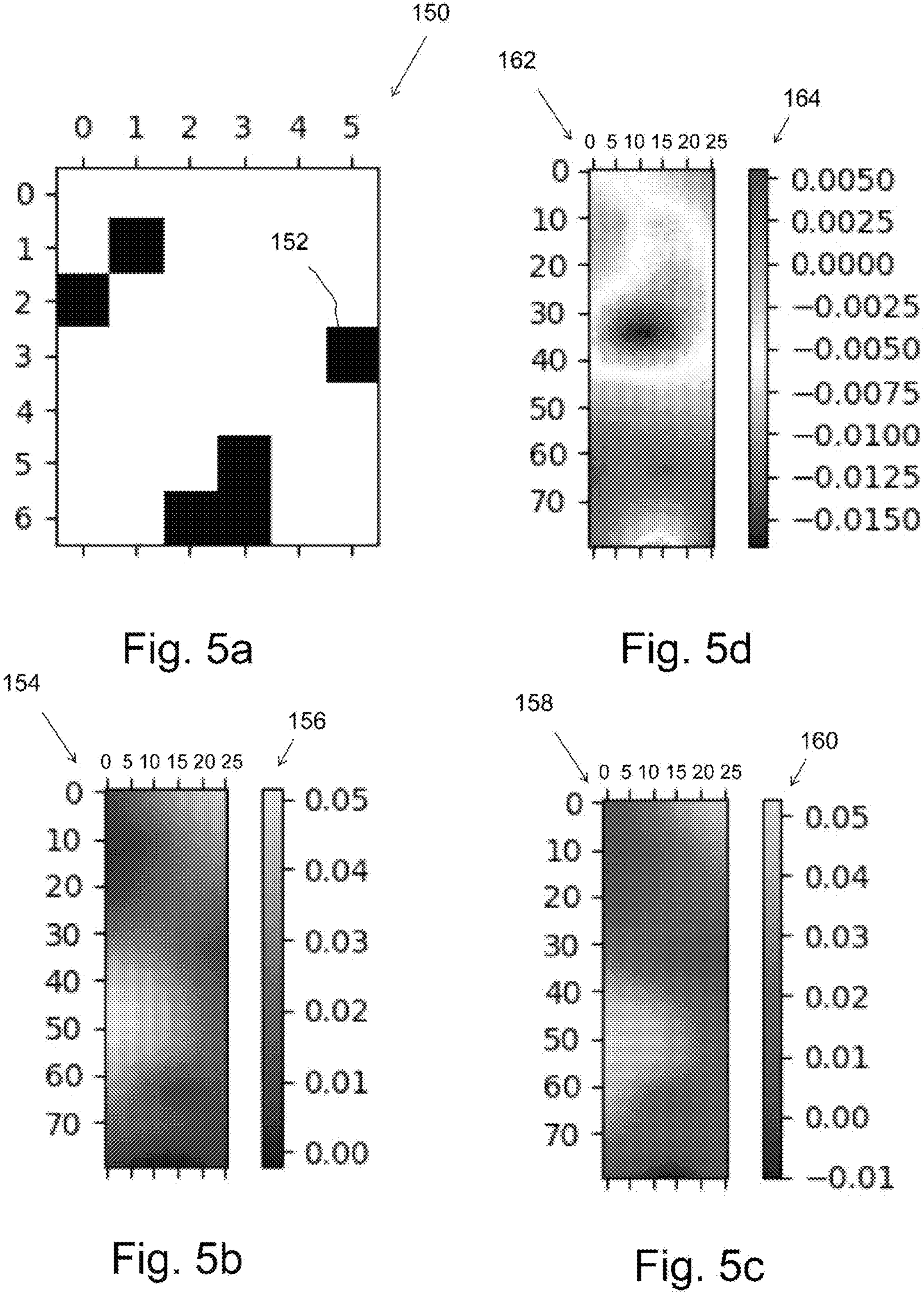
FIG. 5*a* illustrates an example of a fastener pattern that can be input into the ANN for training or validation.
FIG. 5*b* shows a two dimensional color plot representing the estimated displacement of the baffle plate based on fastener pattern shown in FIG. 5*a*, calculated by the FEM.
FIG. 5*c* shows a two dimensional color plot representing the estimated displacement of the baffle plate based on fastener pattern shown in FIG. 5*a*, but calculated by the ANN for validating the ANN.
FIG. 5*d* shows a two dimensional color plot representing the difference between the values illustrated by the plots of FIGS. 5*b*, 5*c;*

FIG. 5*a* illustrates an example of a fastener pattern 150 that can be input into the ANN for training or validation. In this example, the fastener pattern was used for validation. The fastener pattern represents the fasteners of a single baffle plate, illustrating failure data for all of the forty-two fasteners of the baffle plate—arranged in a six by seven pattern illustrating a relational vertical and horizontal position of each of the fasteners. The fastener pattern 150 includes icons 152 representing six different failed fasteners. The remaining thirty-six fasteners have not been identified as failed.

FIG. 5*b* shows a two dimensional color plot 154 representing the estimated displacement of the baffle plate based on fastener pattern 150 shown in FIG. 5*a*, calculated by the FEM. FIG. 3*b* also shows a legend 156 illustrating the estimated displacement associated with each color in the color spectrum of the legend 156. The horizontal axis corresponds to horizontal locations of the baffle plate and the vertical axis corresponds to vertical locations of the baffle plate, to illustrate different displacements of the baffle plate away from the former plates and toward the fuel assemblies in the reactor core. FIG. 5*b* shows that the greatest displacements are estimated to be at the left side of the baffle plate, just below the vertical middle (near the 50 mark), and at the top right corner of the baffle plate.

FIG. 5*c* shows a two dimensional color plot 158 representing the estimated displacement of the baffle plate based on fastener pattern 150 shown in FIG. 5*a*, but calculated by the ANN for validating the ANN. In other words, the fastener pattern 150 and color plot 158 were not used to train the ANN. FIG. 5*c* also shows a legend 160 that is identical to legend 156. Plot 158 of FIG. 5*c* shows substantially the same results as the plot 154 of FIG. 5*b*—the greatest displacements are estimated to be at the left side of the baffle plate, just below the vertical middle, and at the top right corner of the baffle plate.

FIG. 5*d* shows a two dimensional color plot 162 representing the difference between the values illustrated by plots 154, 158. FIG. 5*d* also shows a legend 164 illustrating the color associates of the values for the difference between the displacements shown by plot 154 and the displacements shown by the plot 158 of FIG. 5*c*. FIG. 5*d* illustrates that the difference between the displacements calculated by the FED and the displacements calculated by the ANN are minimal.

Figure 5E:
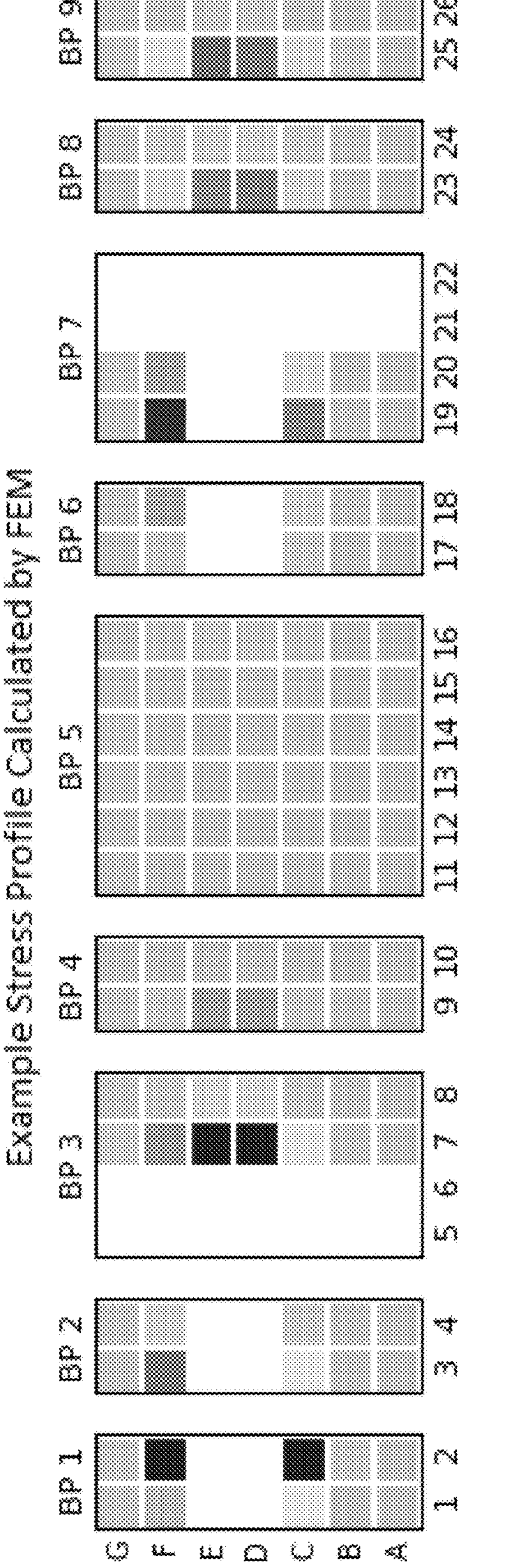
FIG. 5*e* shows a plurality of example fastener stress profiles calculated by FEM.

FIG. 5*e* shows a plurality of example fastener stress profiles calculated by FEM. Each baffle plate is represented as a separate rectangle and each existing fastener is shown as a colored square within the rectangle. White spaces within the rectangles represent locations of failed fasteners. Each colored square has a color that corresponds to value of the stress on the fastener the colored square represents.

A step 108 of method 100 includes determining a future fastener failure probability model of the geometric distribution over time. The future fastener failure probability model involves determining a relative probability of fastener failures in different locations in the analyzed structure, which in this embodiment is the core barrel assembly, as a function of time for all applicable degradation mechanisms.

In this embodiment, the future fastener failure probability model is approximated by a fastener failure rate with respect to location, i.e., a geometric fastener failure distribution, and a fastener failure rate with respect to time, for example using a Weibull distribution. The geometric fastener failure distribution and the fastener failure rate data may be stored in a data record in data structure 206. Alternative embodiments include explicit modeling of individual fastener failure probability as a function of mechanistic considerations, such as stress, temperature, dose, water chemistry, load cycles and other factors contributing to fastener degradation.

The future fastener failure probability model may take into account a bias for individual fasteners or groups of fasteners. Each fastener is given a likeliness of failure depending on its location and the loads and physical factors experienced by the fastener. The bias may either be determined empirically based on operating experience or the bias is determined by explicit models considering physical parameters that vary with time such as material, mechanical, and/or environmental factors applicable to individual fasteners or groups of fasteners. In the empirical bias, each fastener may simply have a fixed failure probability attached to it all the time. By using the model bias, some parameters might very over time, providing an even more accurate estimation by taking time into account for the failure bias.

The future fastener failure probability model may also take into account uncertainty associated with less than 100% non-destructive examination (e.g. via UT) coverage for individual fasteners or groups of fasteners. Because not all the fasteners are accessible for UT inspection, it is assumed that some fasteners are functional or the inaccessible fasteners may be simply ignored in the calculation—i.e., assume the inaccessible fasteners are failure. Visual inspection can be also used for fasteners that are uninspectable via UT.

In a first substep of determining a geometric fastener failure distribution, the IASCC susceptibility is considered for RV internals. IASCC is a mechanism for which materials exposed to neutron irradiation become more susceptible to stress corrosion cracking (SCC) with increasing neutron dose. The first substep of step 104 may include identifying fluence values at which IASCC initiates in RV internal materials, identifying fluence values where mechanical properties of the RV internal materials saturate and identifying variables to define IASCC susceptibility stress. Some key technical bases for age-related degradation mechanisms include (1) the identification of a screening neutron fluence value for initiation of IASCC based on relatively limited data in PWR internals, (2) the indication by laboratory test data that while the mechanical properties appear to saturate at moderate levels of irradiation, susceptibility to IASCC initiation continues to increase at higher doses and (3) the indication that an IASCC susceptibility stress is defined by the irradiated yield strength (which varies by dose, temperature, and effective plastic strain) and a multiplication factor (which varies by dose).

Figure 1A:
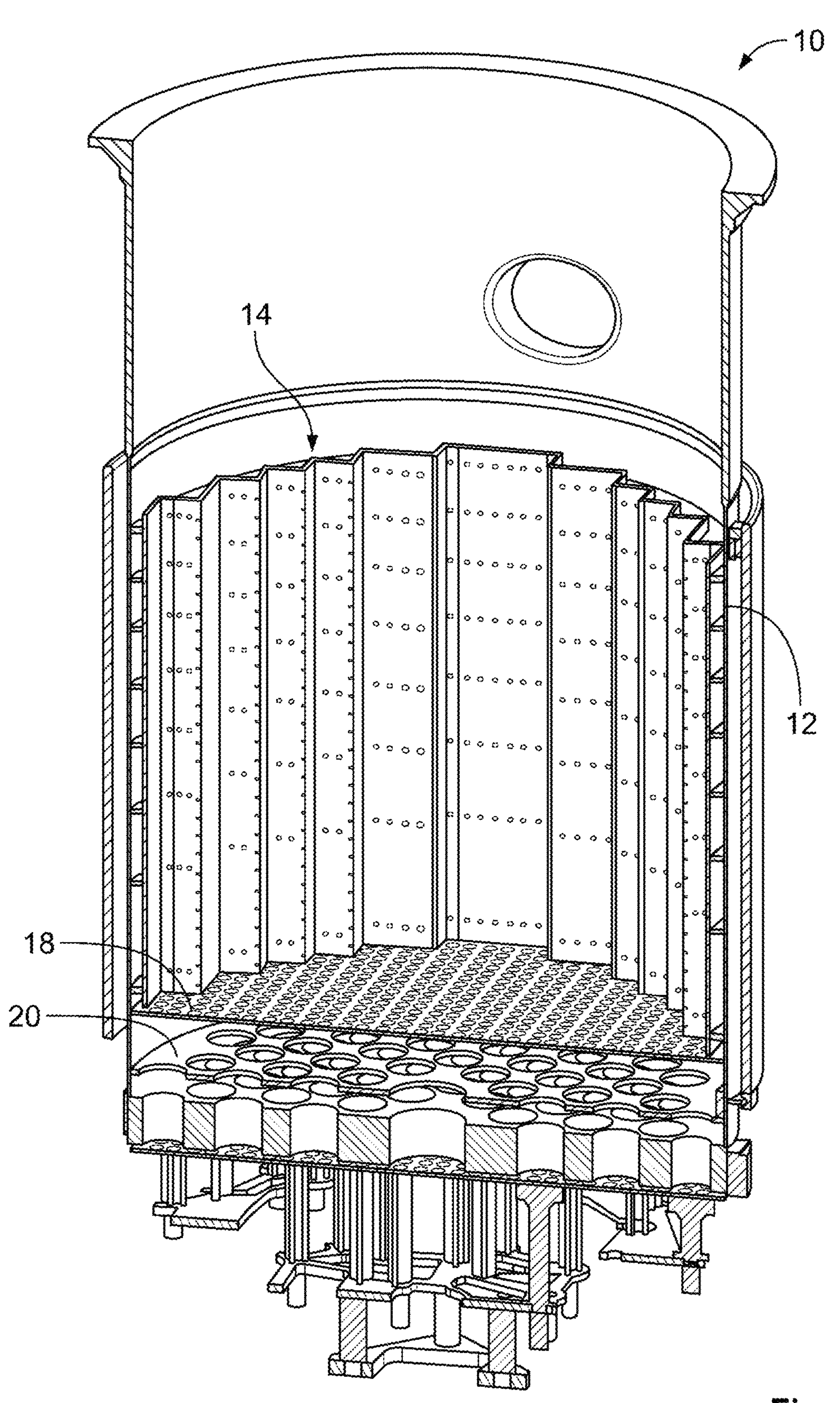
FIG. 1*a* shows a perspective cross-sectional view of components of an exemplary PWR.
Figure 1B:
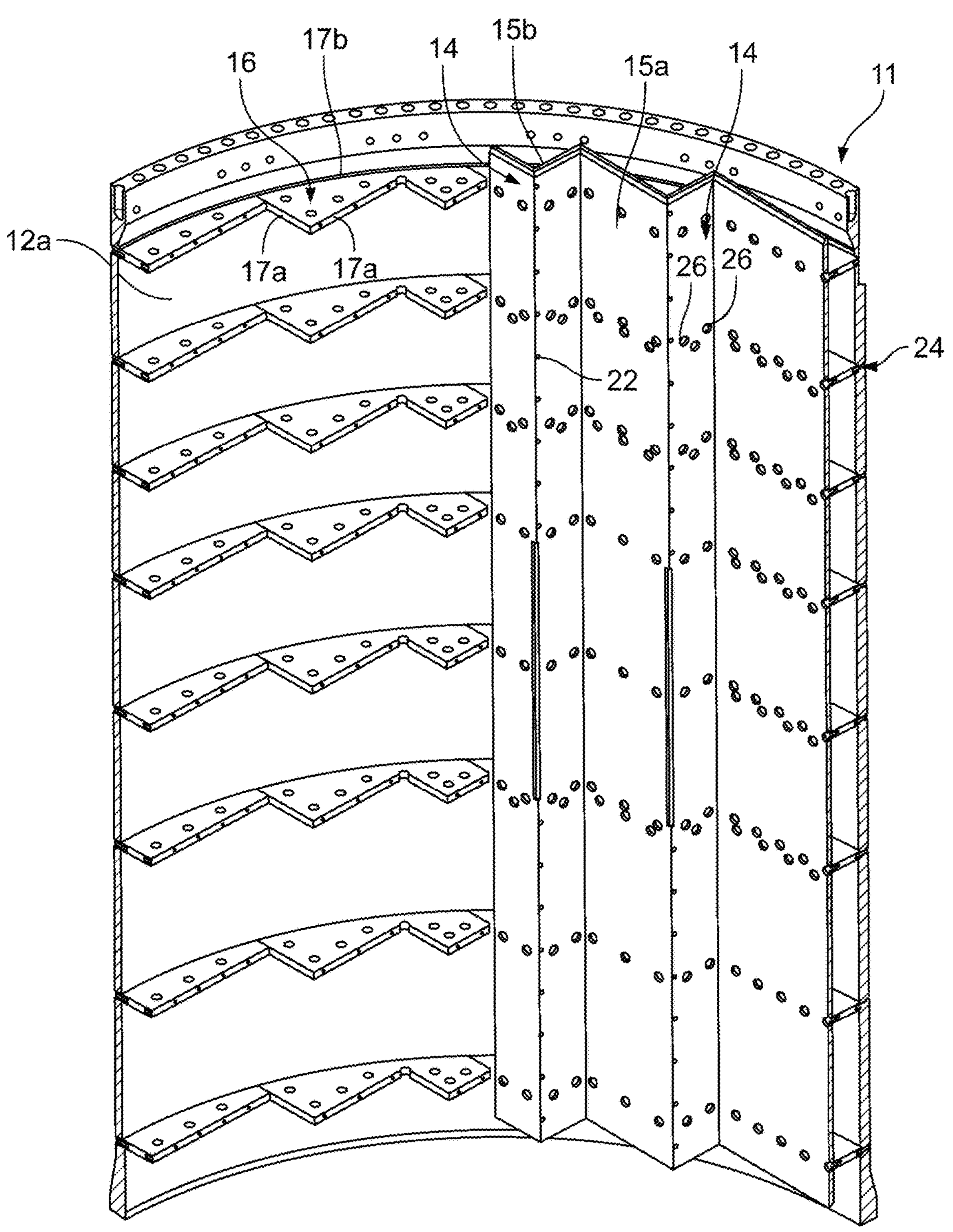
FIG. 1*b* shows an enlarged view cross-sectional view of a portion of a core barrel of the PWR shown in FIG. 1*a* supporting baffles plates via former plates.
Figure 4:
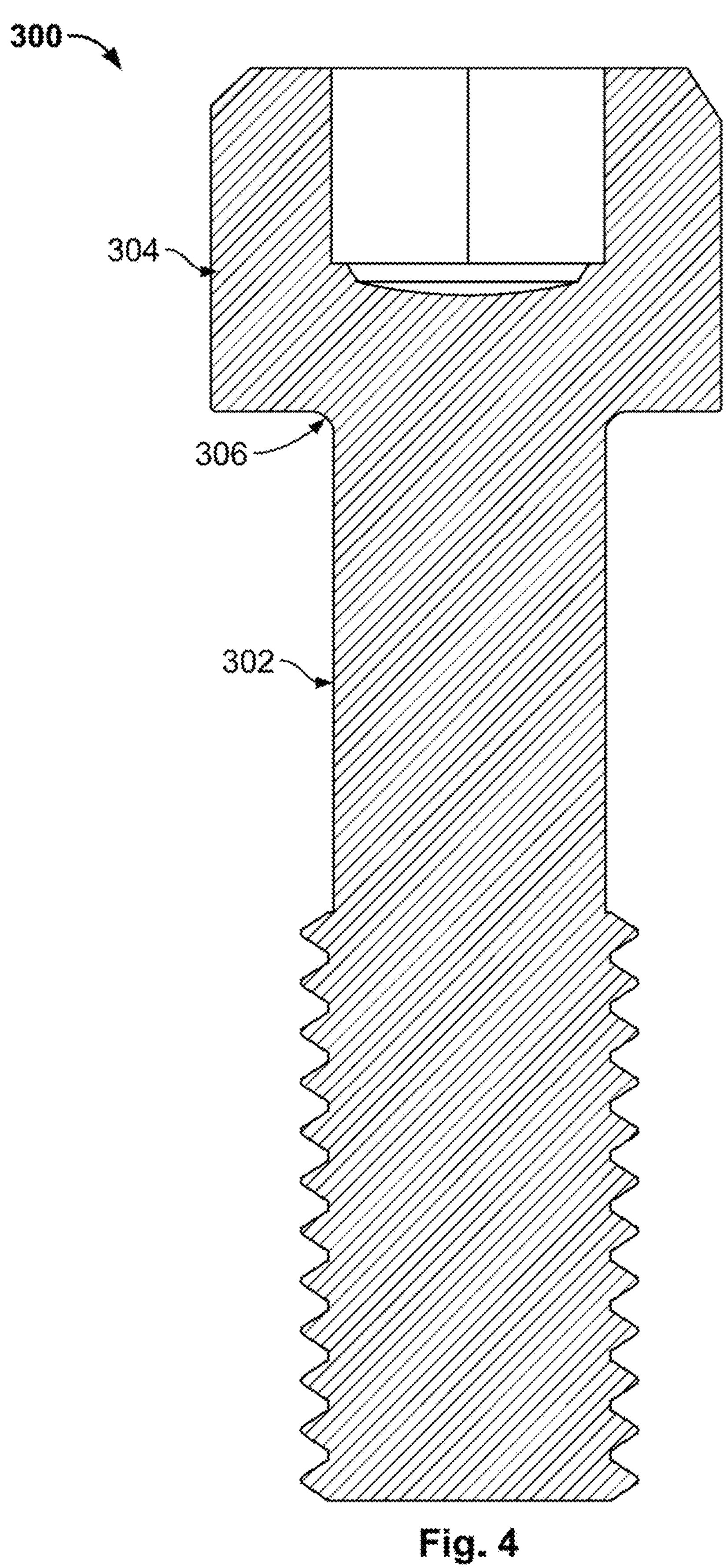
FIG. 4 shows an exemplary B-F/CB-F fastener.

Based on the technical bases considered in the first substep of determining the geometric fastener failure distribution, the IASCC susceptibility considered for RV internals is modeled in a second substep of determining the geometric fastener failure distribution for the fleet of RV internals of the specific RV internals being assessed. For the purposes of this example, generic calculations for the Babcock and Wilcox (B&W) fleet of RV internals are performed to estimate the distribution of neutron does in B-F and CB-F fasteners as a function of time. An exemplary B-F/CB-F fastener 300 is shown in FIG. 4, including a shank 302, a head 304 and a head to shank transition 306. At each time point, estimated dpa values are recorded from shank 302. The dose calculations are performed for each B-F and CB-F fastener by processor 204 and the results of the dose calculations are stored in a data record in data structure 206. Each B-F and CB-F fastener may be identified by a horizontal location identifier, which in this embodiment is a number, a vertical location identifier, which in this embodiment is a row number. For example, referring to FIGS. 1*a*, 1*b*, there are eight rows of former plates and B-F and CB-F fasteners, so the vertical location identifier may be rows one through eight.

In this embodiment, the former plates and the baffle plates may also be are divided into different groups based on plate size, a number of fasteners received by the plate, plate shape and/or vertical location or horizontal location. For example, former plates receiving a first amount of fasteners may be characterized together in the fastener failure model and former plates receiving a second amount of fasteners may be characterized together in the future fastener failure probability model. Or as another example, former plates receiving a first amount of fasteners and in a first set of rows may be characterized together in the fastener failure model, former plates receiving the first amount of fasteners and in a second set of rows may be characterized together, former plates receiving a second amount of fasteners and in the first set of rows may be characterized together in the fastener failure model and former plates receiving the second amount of fasteners and in the second set of rows may be characterized together in the future fastener failure probability model.

Generic calculations for the B&W fleet performed in "Materials Reliability Program: Aging Management Strategies for B&W Pressurized Water Reactor Internals" (MRP-231-Rev. 3). EPRI, Palo Alto, CA: 2014, 3002004284 compare effective stress in the B-F and CB-F bolt shank regions to the IASCC susceptibility stress. The effective stress includes the effects of normal operating loads including gamma heating, void swelling and irradiation enhanced stress relaxation. The result of the comparison is an IASCC ratio (defined as effective stress/IASCC susceptibility stress) where the greater the ratio, the greater the susceptibility to IASCC.

An IASCC ratio may be calculated and displayed for each of the B-F fasteners and for each of the CB-F fasteners over time, or the calculations may only be undertaken for a subset of the B-F fasteners and a subset of the CB-F bolts, such that the relative magnitude of the IASCC ratios may be analyzed. For example, if it is determined based on the dose calculations that a subset of B-F and/or CB-F rows are the most relevant for the future fastener failure probability model, the IASCC ratio calculations may only be undertaken for the most relevant B-F and CB-F fasteners.

In a third substep of determining the geometric fastener failure distribution, the fasteners are assigned a geometric distribution of failure based on the consideration of mechanistic relationships and operating experience. For example, each fastener may be assigned a failure percentage, and the fastener failure percentages are used to determine the cumulative failure percentage of a population of fasteners in the nuclear power plant assembly. In this embodiment, the geometric distribution of failure may be based on the determination of the first and second substeps of determining the geometric fastener failure distribution. For example, based on the results of the first and second substeps of determining the geometric fastener failure distribution, each row of CB-F or B-F fasteners may be give a assigned failure percentage, a plurality of rows of CB-F or B-F fasteners may be given the same failure percentage or a different subset of CB-F or B-F fasteners, such as a subset of identified horizontal fasteners, may be given the same failure percentage. Additionally, based on the results of the first and second substeps of determining the geometric fastener failure distribution, it may be determined that certain subsets of CB-F and B-F fasteners may be disregarded in the analysis for example if the dose or IASCC ratio is lower than a predetermined level over a period of time.

Also, because the CB-F fasteners are not inspectable, some judgment must be made about their failure probability relative to the inspectable leading component item, the B-F fasteners. Insufficient operating experience exists to reliably quantify the difference in failure probability of fasteners as a function of these parameters. Therefore, a conservative assumption is made regarding the CB-F fasteners failure probability with respect to time relative to the B-F fasteners. Failed CB-F fasteners are only expected if B-F fastener failures are observed.

Once failures of B-F fasteners are observed and additional margin is desired from this analysis, it may be possible to use the failed B-F fastener experienced feedback to quantify the failure probability as a function of dose, stress, and other parameters. This may permit a more realistic estimate of the CB-F fastener failure probability relative to the B-F fastener failure probability.

For example, if the dose at a row of B-F fasteners is less than the a predetermined threshold for IASCC initiation, and mechanical stresses on the fasteners are determined to remain in an acceptable range for a future time, the row of fasteners may be assumed to be intact, especially if B-F fasteners have not been observed in the row in other core barrel assemblies.

As another example, as mentioned above, subsets of B-F fasteners may be given a uniform geometric distribution of failures, meaning each fastener in the subset is considered equally likely to fail. The grouping of the subset may be based for example on an amount preconditioning, the amount of dose at a region of maximum stress and a temperature of the fasteners. As noted above, step 104 also includes determining a fastener failure rate with respect to time. A fastener failure rate with respect to time may be determined by establishing a probability distribution. In this embodiment, the probability distribution is a Weibull distribution. The Weibull distribution is widely applicable to modeling results of corrosion testing and the performance of equipment. The Weibull framework has been applied to numerous reliability applications, including corrosion problems and life data, due to its flexibility and utility with limited data. Statistical distributions such as the Weibull distribution have no fundamental connection to physical processes. This distribution is usually used for modeling data, and emphasis is traditionally placed on the goodness of fit rather than the physical significance.

Figure 6:
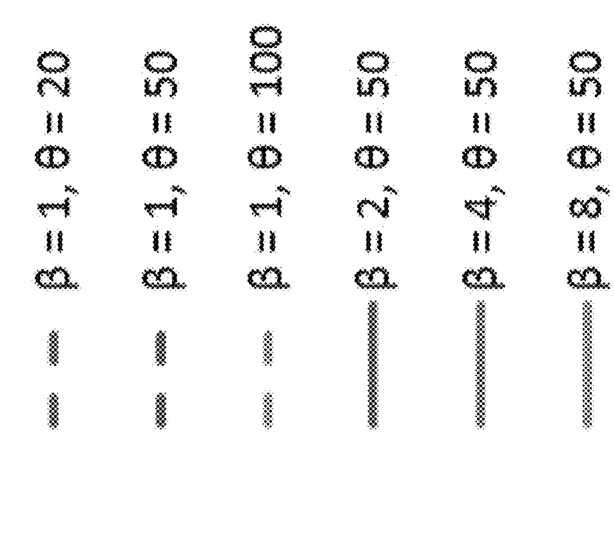
FIG. 6 shows a two-parameter Weibull cumulative distribution function plotted for various β, θ pairs.
Figure 6:
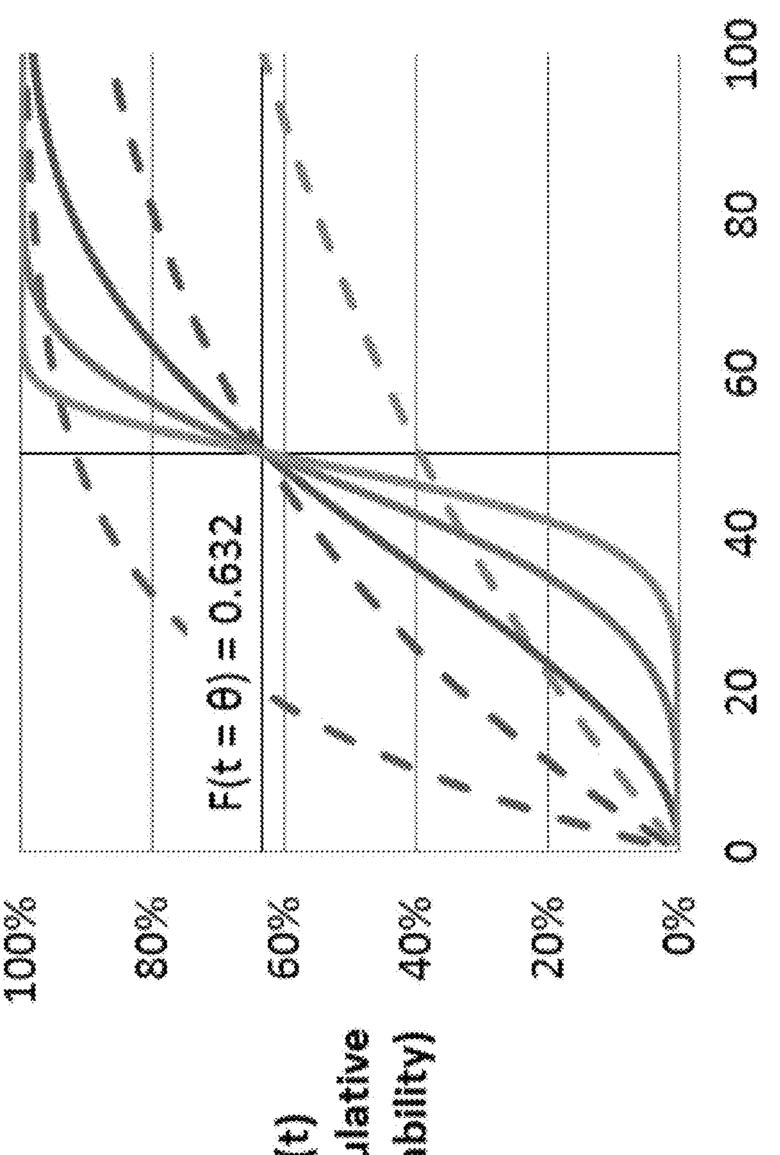
Figure 6:

The two-parameter Weibull cumulative distribution function (CDF) is given below in equation 1 and the CDF is plotted for various β, θ pairs in FIG. 6 as an example, plotting the cumulative probability of failure F(t) as a function of time t, in the units of EFPY.

$$F(t) = 1 - \exp\left[-\left(\frac{t}{\theta}\right)^{\beta}\right] \tag{1}$$

Where: θ=the characteristic time equal to the time to a 63.2% cumulative fraction of failure; and β=slope or shape parameter.

The Weibull parameter θ is the time at which F(t)=63.2%. This can be viewed as an "average" time of failure.

In a first substep of determining the fastener failure rate with respect to time, a shape parameter β is chosen. The shape parameter, β, is a measure of the variation in failure times. As shown in FIG. 6, the greater the shape parameter, the smaller the range in failure times. For the purposes of predicting failures in the future, it is conservative to choose a high β, for example one that is higher that estimates based on the inspection of other known assemblies, which will over-predict future failures.

A next substep of determining the fastener failure rate with respect to time includes estimating upper bound values of the shape parameter β from fastener inspection results. In this embodiment, the upper bound values of the shape parameter β may be estimated from B-F bolt volumetric inspection results. The uncertainty of β may be estimated for each B-F bolt inspection dataset using one or more known statistical methods.

A conservative upper bound (greater than 95% probability with a 95% confidence—i.e., a 95/95 one-sided upper bound) β and a conservative (i.e., higher than expected, but not as conservative as the conservation upper bound) best estimate β were determined. A next substep of determining the fastener failure rate with respect to time includes estimating the scale parameter θ by fitting a Weibull distribution with a given β, which may be between the conservative upper bound β and the conservative best estimate β and is known to predict failure rate in RV internals, through the cumulative failure percentage of the population of fasteners in the nuclear power plant assembly determined in the third substep of determining the geometric fastener failure distribution in step 104. Alternatively, rather than being based on a fixed percentage, β may be replaced by another model taking into account parameters, such as a sophisticated model for each of the bolts or group of bolts taking into account characteristics such as the temperature fatigue, the radiation, the loads and the chemical environment.

The future fastener failure probability model may take into account fastener stresses calculated by the ANN to provide more accurate assessments of each bolt spacing pattern. In the probabilistic method based on fastener spacing rules in U.S. Publication No.: 2017/0337298, the stress on each fastener was assumed to be constant over time. For example, as more fasteners failed in a baffle plate over time, the stress on the remaining fasteners was not modified to take into account the impact of the failure of fasteners on the remaining fasteners. Using the fasteners stress from the ANN allows the future fastener failure probability model to take into account the impact of the failure of fasteners on the remaining fasteners as further iterations are performed, such that the stress of each bolt is updated with each iteration.

In a step 110, the future fastener failure probability model may be used for simulating a quantity and location of failed fasteners that were not identified by UT inspection as being failed. UT inspection is not 100% accurate and can result in failed fasteners as being identified as operative. Input from the future fastener failure probability model is used in step 100 to update the geometric fastener failure distribution by identifying additional fasteners as being considered as being failed. For example, if empirical evidence shows that 5% of failed fasteners are missed by UT inspection, the future fastener failure probability model may identify 5% of fasteners that were indicated as being operable in steps 102, 104 as failed in step 110, at statistically likely failure locations.

A step 112 includes projecting a quantity and location of additional fastener failures over time. More specifically, step 112 includes generating, by processor 204 of computer 200, a plurality of random future fastener failure patterns by applying the fastener failure model to the geometric fastener failure distribution at a given time T1>T0. This includes applying a random future fastener fail percentage to the geometric fastener failure distribution to generate the random future fastener failure patterns at the given time T1, for example via a Monte Carlo simulation. For each iteration of step 112, Next, a step 114 includes evaluating a structural integrity of the future state at the given time T1 by inputting each of the random future fastener failure patterns into the trained ANN and outputting baffle plate displacements and fastener stresses for each of the random future fastener failure patterns. The loop extending from step 114 back to step 110 illustrates that each of steps 110, 112, 114 are performed for each of the random future fastener failure patterns. Accordingly, for the population of the random future fastener failure patterns at T1, a number of different possibilities of displacements of each of the baffle plates and possibilities of fastener stresses are generated for each initial geometric distribution.

Then, in step 116 includes determining a probability of maintaining an acceptable fastener pattern at time T1 based on the population of the random future fastener failure patterns at T1. Step 116 involves comparing the baffle plate displacement values and fastener stress values for each of the random future fastener failure patterns to known acceptable baffle plate displacement values and fastener stress values to determine if each of the random future fastener failure patterns is sufficiently safe to justify the acceptability of the fasteners for continued operation of the nuclear power plant assembly. Based on the random future fastener failure patterns being deemed to be acceptable or unacceptable, the probability that the initial geometric distribution of fasteners will be acceptable at time T1 is determined by dividing the acceptable number of the random future fastener failure patterns at time T1 by the number of the total population of generated the random future fastener failure patterns at time T1.

As shown by the loop extending from step 116 back to step 104, these steps are iterated, by processor 204 of computer 200, for a given range of values T2, T3, . . . , Tx>T0 and then at step 118, a minimum probability of a population of the random future fastener failure patterns for a given initial fastener pattern being acceptable—i.e., having acceptable baffle plate displacements and acceptable fastener stresses—is determined. In other words, a maximum future time Tmax at which a predetermined acceptable probability of the population of future fastener failure patterns for a given initial fastener pattern having acceptable baffle plate displacements and fastener stresses is identified, thereby justifying the acceptability of the fasteners for continued operation of the nuclear power plant assembly. As one example, the guidelines set forth in WCAP-17096-NP-A Interim Guidance may be used for showing acceptability of the population of future failure patterns at a specific future time—i.e., at least 95% of the number of the total population of random future fastener failure patterns are usable without failure.

For example, if the predetermined acceptable probability of the population of fastener failure patterns having acceptable baffle plate displacements and fastener stresses is 95%, the iterations are continued based on an initial fastener pattern until a sufficient number of time values are evaluated to determine a maximum future time Tmax where 95% of the random fastener failure patterns are predicted as having acceptable baffle plate displacements and fastener stresses. In such an instance, ideally, the maximum future time Tmax would be a time at which exactly 95% of the random fastener failure patterns are predicted as having acceptable baffle plate displacements and fastener stresses. For example, a future time where 96% of the random fastener failure patterns are predicted as having acceptable baffle plate displacements and fastener stresses would be deemed overly conservative, so the loop would be rerun with a greater future time, at which exactly 95% of the random fastener failure patterns are predicted as having acceptable baffle plate displacements and fastener stresses. If the percentage dropped below 95%, the future time would be decreased and the loop would be rerun.

In contrast to the method described in U.S. Publication No.: 2017/0337298, as noted above, the method of the present disclose may include updating the fastener stress in each progressive iteration of the loop between steps 104 and 116. More specifically, for step 112, the future fastener failure probability model uses different fasteners stresses for each individual failure pattern in each iteration, with each individual failure pattern in the prior iteration being updated based on the fastener stresses being determined by the ANN in the prior step. For example, assuming for illustrative purposes that 100 random failure patterns are generated in by step 112 at time T1 based on the initial stress on each of the fasteners in the initial fastener pattern, the fastener stresses and baffle plate displacements are determined for each of the 100 random failure patterns in step 114. Then, the fastener stresses determined in step 114 at time T1, are used by the future fastener failure probability model in the next iteration to determine the future failure pattern at time T2 for each of the 100 future failure patterns. The 100 future failure patterns at time T2 would then be input into the ANN in step 114 to determine the fastener stresses and baffle plate displacements for each of the 100 random failure patterns at time T2. This process would again be repeated, using the fastener stresses determining in step 114 at time T2 to calculated future failure patterns in step 112 in the next iteration at time T3.

After the maximum future time Tmax having an acceptable future fastener failure pattern probability based on a probability probably of acceptable future fastener failure pattern, a step 120 includes determining the operability interval. The operability interval is the time it takes to go from the current fastener failure percentage to the maximum allowable fastener failure percentage, based on the projected fastener failure rate with respect to time estimated by the Weibull distribution. The operability interval is calculated by subtracting the initial time T0 from the maximum future time Tmax. Determining the operability interval is extremely important in nuclear reactor servicing, as too long an operability interval can have safety risks, and too short an operability interval can have negative economic consequences.

In an alternative embodiment, the probabilistic structural analysis of method 100 may be used to determine the fastener locations and combinations where replacement fasteners would have the maximum benefit to ensuring functionality for a specified time period, such as 1 cycle, 10 years or 30 years, for the RV internals fastening. More specifically, in step 104, a first theoretical replacement bolt pattern may be specified, then steps 110, 112, 114 and 116 may be iteratively run for the specified first theoretical replacement bolt pattern to determine a maximum future time Tmax at which the fastener failure patterns for the specified first theoretical replacement bolt pattern satisfy the predetermined acceptable probability. Then, a different specified second theoretical replacement bolt pattern is specified in step 104, and steps 110, 112, 116 are repeated to determine maximum future time Tmax. This process may be repeated, as shown by step 122, a number of times until a satisfactory number of theoretical replacement bolt patterns have been specified and tested for maximum future time Tmax, then the specified theoretical replacement bolt pattern having the greatest maximum future time Tmax is selected and implemented, in a step 124 in the reactor core during a shutdown of the reactor. More specifically, step 124 involves actively installing a number of replacement CB-F bolts in the baffle plates in the theoretical replacement bolt pattern having the greatest maximum future time Tmax as determined in step 122. Accordingly, step 124 involves a physical change to the core barrel assembly.

In another alternative embodiment, the probabilistic structural analysis of method 100 may be used to determine a re-examination interval for limited fastener inspection scope, based on statistical sampling techniques.

Method 100 can be applied to other nuclear power plant assemblies, including fasteners of pumps used in a nuclear power plant, lower grid assembly-to-core barrel fasteners or flow distributor-to-lower grid shell forging fasteners. Flow distributor-to-lower grid shell forging fasteners are part of the lower RV internals assembly and are used to attach the flow distributor assembly to the lower grid shell forging. The flow distributor assembly in B&W operating units is designed to be fastened to the bottom of the lower grid shell forging with ninety-six fasteners secured with locking clips. In other embodiments, the method may be applied to other fasteners in nuclear power plant assemblies, including rivets, split pins and welds.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

In particular, the probabilistic method may be implemented with a machine learning model that is not necessarily an artificial neural network (ANN) and in particular a convolutional neural network (CNN). In variants, the probabilistic method is implemented using a machine learning model that is a parsimonious ANN or any regression model, such as linear models, support vector machines, nearest neighbors processes, Gaussian processes or Bayesian processes, decision trees, or any known similar machine learning methods or processes.

What is claimed is:

1. A probabilistic method for determining an operability interval for fasteners retaining components in a nuclear power plant assembly comprising:

providing a geometric distribution of a given initial condition of fasteners in the nuclear power plant assembly at an initial time T0;

generating a plurality of random future fastener failure patterns by applying a fastener failure probability model to the geometric distribution at a given time T1>T0;

inputting the plurality of random future fastener failure patterns at time T1 into a machine learning model and outputting stresses of the fasteners and displacements of the components;

iterating, by a processor of a computer, the applying and inputting steps for a given range of time values T2, T3, . . . , Tx>T0 and determining a maximum future time Tmax at which a predetermined acceptable probability of the fastener failure patterns having acceptable values of the stresses of the fasteners and displacements of the components, thereby justifying the acceptability of the fasteners for continued operation of the nuclear power plant assembly;

determining the operability interval as being the maximum future time Tmax minus the initial time T0; and installing replacement fasteners in the nuclear power plant assembly in accordance with the pattern of replacement fasteners having the greatest maximum future time Tmax, the fasteners and replacement fasteners being bolts of a core barrel assembly, the bolts including:

baffle-former bolts connecting former plates to baffle plates, core barrel-former bolts connecting the former plates to a core barrel, and baffle-baffle bolts connecting baffle plates to baffle plates of a core barrel assembly.

2. The probabilistic method as recited in claim 1, wherein the iterating includes inputting the stresses of the fasteners and displacements of the components for time T1 into the fastener failure probability model to update each of the random future fastener failure patterns at time T2.

3. The probabilistic method as recited in claim 1, wherein the geometric distribution of the fasteners includes as found conditions of existing fasteners or a combination of existing fasteners with replacement fasteners to be installed at some time T≥T0.

4. The probabilistic method as recited in claim 1, wherein future fastener failure probability models are based on a probability distribution.

5. The probabilistic method as recited in claim 4, wherein the probability distribution for the future fastener failure probability model is based on a Weibull distribution.

6. The probabilistic method as recited in claim 1, further comprising training the machine learning model using fastener failure pattern inputs and fastener stress and component displacement outputs.

7. The probabilistic method as recited in claim 1, wherein the machine learning model is an artificial neural network.

8. A probabilistic method for determining an operability interval for fasteners retaining components in a nuclear power plant assembly comprising:

(a) providing a geometric distribution of a given initial condition of fasteners in the nuclear power plant assembly at an initial time T0;

(b) generating a plurality of random future fastener failure patterns by applying a fastener failure probability model to the geometric distribution at a given time T1>T0;

(c) determining stress of the fasteners and displacements of the component for each of the plurality of random future fastener failure patterns at time T1;

(d) determining a probability of the plurality of random future fastener failure patterns being acceptable as a population at time T1;

(e) applying the fastener failure probability model to the geometric distribution at a given time T2>T1 by taking into consideration the stress of the fasteners and displacements of the component for each of the plurality of random future fastener failure patterns at time T1;

(f) determining stress of the fasteners and displacements of the component for each of the plurality of random future fastener failure patterns at time T2;

(g) determining a probability of the plurality of random future fastener failure patterns being acceptable as a population at time T2;

(h) iterating, by a processor of a computer, steps (d) to (g) for a given range of time values T3, T4, . . . , Tx>T2 and determining a maximum future time Tmax at which a predetermined acceptable probability of the fastener failure patterns having acceptable values of the stresses of the fasteners and displacements of the components, thereby justifying the acceptability of the fasteners for continued operation of the nuclear power plant assembly;

(i) determining the operability interval as being the maximum future time Tmax minus the initial time T0; and (j) installing replacement fasteners in the nuclear power plant assembly in accordance with the pattern of replacement fasteners having the greatest maximum future time Tmax, the fasteners and replacement fasteners being bolts of a core barrel assembly, the bolts including:

baffle-former bolts connecting former plates to baffle plates, core barrel-former bolts connecting the former plates to a core barrel, and baffle-baffle bolts connecting baffle plates to baffle plates of a core barrel assembly.

9. A probabilistic method for replacing fasteners retaining components in a nuclear power plant assembly comprising:

(a) providing a geometric distribution of a given initial condition of fasteners in the nuclear power plant assembly at an initial time TO, the given initial condition including a pattern of replacement fasteners;

(b) generating a plurality of random future fastener failure patterns by applying a fastener failure probability model to the geometric distribution at a given time T1>T0;

(c) inputting the plurality of random future fastener failure patterns at time T1 into a machine learning model, for example an artificial neural network, and outputting stresses of the fasteners and displacements of the components;

(d) iterating, by a processor of a computer, the applying and inputting steps for a given range of time values T2, T3, . . . , Tx>T0 and determining a maximum future time Tmax at which a predetermined acceptable probability of the fastener failure patterns having acceptable values of the stresses of the fasteners and displacements of the components, thereby justifying the acceptability of the fasteners for continued operation of the nuclear power plant assembly; and (e) performing steps (a) to (d) for a plurality of different patterns of replacement fasteners;

(f) selecting the pattern of replacement fasteners having the greatest maximum future time Tmax as fastener replacement strategy; and installing replacement fasteners in the nuclear power plant assembly in accordance with the pattern of replacement fasteners having the greatest maximum future time Tmax, the fasteners and replacement fasteners being bolts of a core barrel assembly, the bolts including:

baffle-former bolts connecting former plates to baffle plates, core barrel-former bolts connecting the former plates to a core barrel, and baffle-baffle bolts connecting baffle plates to baffle plates of a core barrel assembly.

10. The probabilistic method as recited in claim 9, wherein the machine learning model is an artificial neural network, in particular a convolutional neural network.

* * * * *